(12) United States Patent
He et al.

(10) Patent No.: US 8,176,180 B2
(45) Date of Patent: May 8, 2012

(54) DYNAMICALLY MATCHING DATA SERVICE CAPABILITIES TO DATA SERVICE LEVEL OBJECTIVES

(75) Inventors: Zhengwen He, Rochester, MN (US); Bernhard Julius Klingenberg, Morgan Hill, CA (US); David Gregory Van Hise, Tucson, AZ (US); William Roy Yonker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 11/757,671

(22) Filed: Jun. 4, 2007

(65) Prior Publication Data

US 2008/0301255 A1    Dec. 4, 2008

(51) Int. Cl.
    *G06F 15/173*    (2006.01)
(52) U.S. Cl. .................. 709/226; 709/223; 709/224
(58) Field of Classification Search ............ 709/226, 709/223, 224
    See application file for complete search history.

(56) References Cited

U.S. PATENT DOCUMENTS

| | | | | |
|---|---|---|---|---|
| 2003/0149755 | A1* | 8/2003 | Sadot | 709/223 |
| 2004/0181476 | A1* | 9/2004 | Smith et al. | 705/35 |
| 2004/0267916 | A1 | 12/2004 | Chambliss et al. | |
| 2005/0177545 | A1 | 8/2005 | Buco et al. | |
| 2006/0047802 | A1 | 3/2006 | Iszlai et al. | |
| 2006/0161884 | A1 | 7/2006 | Lubrecht et al. | |
| 2006/0171509 | A1 | 8/2006 | Berthaud et al. | |
| 2006/0218155 | A1 | 9/2006 | Fisher et al. | |
| 2006/0245369 | A1 | 11/2006 | Schimmelpfeng et al. | |
| 2006/0253725 | A1 | 11/2006 | Chen et al. | |
| 2006/0282519 | A1* | 12/2006 | Trevathan et al. | 709/223 |
| 2008/0172673 | A1* | 7/2008 | Naik | 718/104 |

FOREIGN PATENT DOCUMENTS

JP    2005-92886    4/2005

OTHER PUBLICATIONS

IBM Tivoli Storage Process Manager Version 1.1.1 information, IBM, http://publib.boulder.ibm.com/infocenter/tivihelp/v10r1/index.jsp?topic=/com, Jul. 28, 2006.

* cited by examiner

*Primary Examiner* — Jeffrey Pwu
*Assistant Examiner* — Shripal Khajuria
(74) *Attorney, Agent, or Firm* — Francis Lammes; Stephen J. Walder, Jr.; Feb R. Cabrasawan

(57) ABSTRACT

A method, system, and computer program product are provided for matching a storage dependent device to a storage subsystem. Storage requirements are identified for a storage dependent device that is coupled to a network. Additionally, a set of storage subsystems that are coupled to the network are identified. A determination is made as to whether at least one storage subsystem in the set of storage subsystems meets the storage requirements of the storage dependent device. An identified storage subsystem is formed by identifying the at least one storage subsystem that meets the storage requirements of the storage dependent device. Responsive to forming the identified storage subsystem, at least one storage subsystem is coupled to the storage dependent device, wherein the storage dependent device utilizes storage capabilities of the identified storage subsystem.

14 Claims, 4 Drawing Sheets

DYNAMICALLY MATCHING DATA SERVICE CAPABILITIES TO DATA SERVICE LEVEL OBJECTIVES

BACKGROUND

1. Technical Field

The present application relates generally to an improved data processing system and method. More specifically, the present application is directed to dynamically matching data service capabilities to data service level objectives.

2. Description of Related Art

Remote data storage is a feature, offered to and within businesses, that automatically backs up and stores data in a remote location. Remote data storage systems are customized to meet the individual customer's needs. Remote data storage provides a secure means to store data by ensuring the continuation of business in the event of a major disaster or even a server meltdown. One of the tasks facing administrators of remote data storage systems is the need to balance the capabilities of the storage devices of the system with the service level agreement that is committed to each customer. Balancing the capabilities of the storage devices with the service level agreements is an ongoing challenge as the service level agreements change over time and storage devices are added, removed, or fail within the storage system.

Some current products provide administrators the ability to quantify data related service level agreements and the storage capabilities of the system's storage devices. By attempting to match the agreements with the storage capabilities, administrators are able to determine, through labor intensive identification, if the storage capabilities required to meet the service level agreements exist. However, since remote data storage systems frequently change, the labor intensive matching of the service level agreements to the storage capability needs is burdensome to keep current at all times.

Additionally, when a problem arises, such as an application not responding due to a storage device failure, determining which storage subsystems are available to meet the requirements in the service level agreements is important. Current identification of available storage subsystems is also a labor intensive process. In current products, the quantification of storage devices to service level agreements is performed by defining data service level objective groups (DSLOGs) where the data service level objectives groups may be constrained by some metric, such as recovery time, recovery point, cost, read/write ratio, or some set of custom requirements. A DSLOG is a collection of data service level objectives (SLOs) that describe the service requirements that data has on the supporting data and storage services for a given business use. In the current products each DSLOG is stored as a configuration item in a database.

Additionally, storage devices have to be discovered and represented in the database. Capabilities for various storage devices can be quantified, which is also stored in the database. The collection of capabilities of storage devices, such as cost and read/write ratio, can be defined and stored as a data service capabilities (DSCs) object in the database. Each of the discovered storage devices can be associated with a particular DSC.

Therefore, in addition to the labor intensive process of identifying storage devices and DSLOGs and after creating DSCs for the storage devices, the administrators may still have to determine which DSCs fulfill the requirements stated in each DSLOG. If there are a large number of DSCs and DSLOGs, each specifying multiple objectives/capabilities, the matching of DSCs to DSLOGs is in itself a difficult task. Additionally, DSLOG to DSC mappings may become invalid if conditions change, thus, creating an exposure of failing to meet service agreements.

SUMMARY

The illustrative embodiments provide for automatically finding and dynamically maintaining optimum data service capabilities to data service level objective group device matches. Automatically finding and dynamically maintaining optimum device matches provides benefits that include: sparing users the tedious task of trying to identify matches manually, eliminating the chance for human error in assigning matches, improving the accuracy of maintaining accurate matches since users may neglect to verify and/or update matches as conditions change, and identifying potential problem areas in the matches, such as when a match may not be readably identifiable or when a particular device is over-relied upon.

The illustrative embodiments provide for matching a storage dependent device to a storage subsystem. The illustrative embodiments identify storage requirements for the storage dependent device that is coupled to a network. The illustrative embodiments also identify a set of storage subsystems that are coupled to the network. The illustrative embodiments determine if at least one storage subsystem in the set of storage subsystems meets the storage requirements of the storage dependent device. Responsive to identifying the at least one storage subsystem that meets the storage requirements of the storage dependent device, thereby forming an identified storage subsystem, the illustrative embodiments couple the at least one storage subsystem to the storage dependent device. The storage dependent device utilizes storage capabilities of the identified storage subsystem.

Responsive to a failure to identify the at least one storage system that meets the storage requirements of the storage dependent device, the illustrative embodiments perform at least one of: identifying the at least one storage subsystem that exceeds the storage requirements, identifying the at least one storage subsystem that matches a user defined portion of the storage requirements, identifying the at least one storage subsystem that matches a type of the storage dependent device, or identifying the at least one storage subsystem that is physically coupled to the storage dependent device. Responsive to identifying the at least one storage subsystem, the illustrative embodiments couple the at least one storage subsystem to the storage dependent device. This forms an identified storage subsystem.

Responsive to identifying more than one storage subsystem that meets the storage requirements of the storage dependent device, the illustrative embodiments determine at least one lowest cost storage subsystem. Responsive to identifying the at least one lowest cost storage subsystem, the illustrative embodiments couple the at least one lowest cost storage subsystem to the storage dependent device.

The illustrative embodiments determine if a use of the identified storage subsystem exceeds an assignment limit. Responsive to use of the identified storage subsystem exceeding the assignment limit, the illustrative embodiments remove the identified storage subsystem from the set of storage subsystems that meet the storage requirements of the storage dependent device. The illustrative embodiments determine if another storage subsystem in the set of storage subsystems meets the storage requirements of the storage dependent device. Responsive to identifying another storage subsystem that meets the storage requirements of the storage dependent device, the illustrative embodiments couple another storage subsystem to the storage dependent device.

In removing the identified storage subsystem from the set of storage subsystems that meet the storage requirements of the storage dependent device, the illustrative embodiments mark the identified storage subsystem as unavailable in a data structure and send a notification to a user that the identified storage subsystem is unavailable.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide mechanisms for dynamic matching of data service capabilities (DSCs) to data service level objective groups (DSLOGs). With the illustrative embodiments, a data processing system discovers the DSCs and DSLOGs and matches the DSCs to the DSLOGs using the service level agreements for the particular DSLOGs based on user defined criteria.

Figure 1:
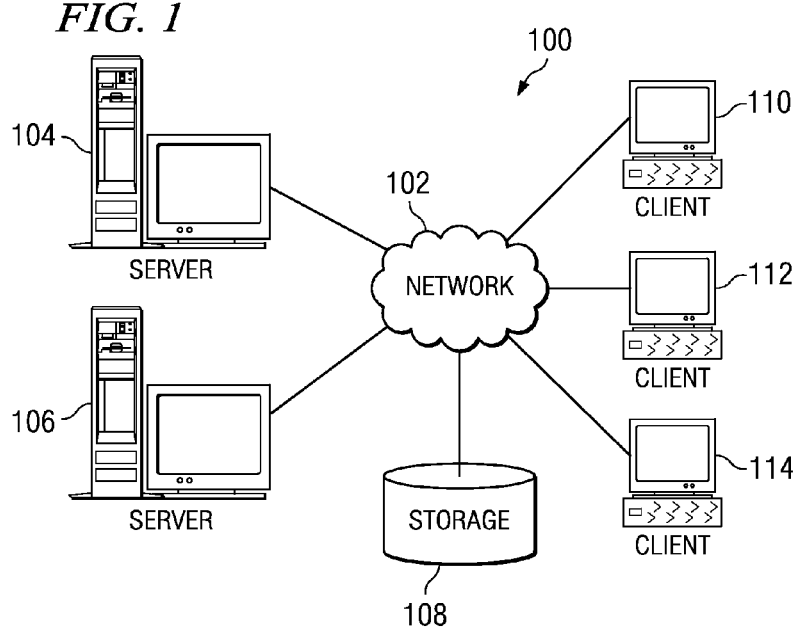
FIG. 1 represents an exemplary distributed data processing system in which aspects of the illustrative embodiments may be implemented.
Figure 2:
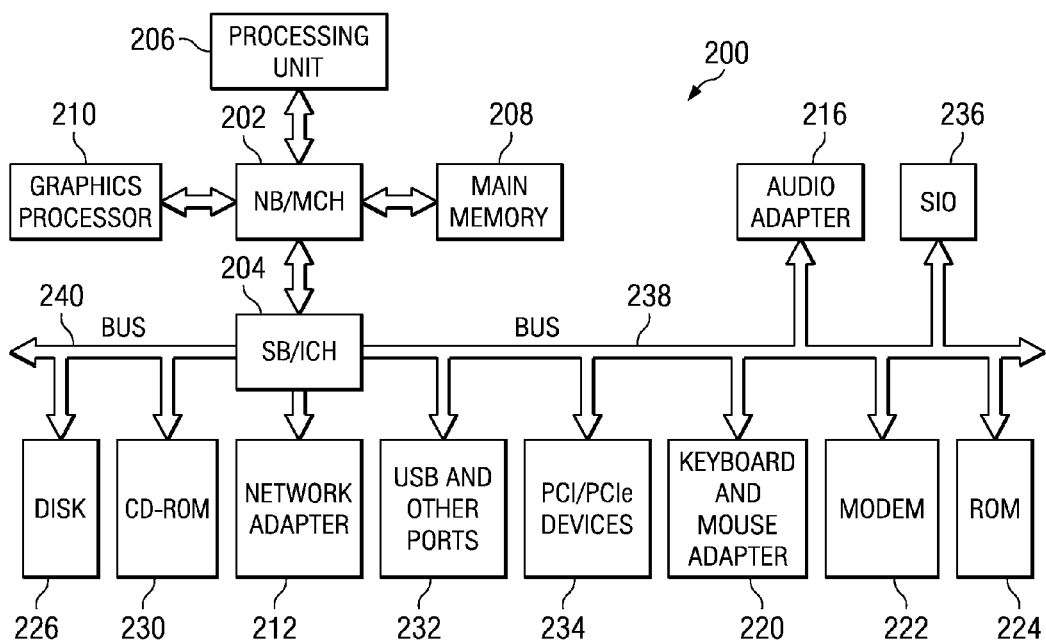
FIG. 2 is a block diagram of an exemplary data processing system in which aspects of the illustrative embodiments may be implemented.

With reference now to the figures and in particular with reference to FIGS. 1 and 2, exemplary diagrams of data processing environments are provided in which illustrative embodiments of the present invention may be implemented. It should be appreciated that FIGS. 1 and 2 are only exemplary and are not intended to state or imply any limitation with regard to the environments in which aspects or embodiments of the present invention may be implemented. Many modifications to the depicted environments may be made without departing from the spirit and scope of the present invention.

With reference now to the figures, FIG. 1 represents an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide for automatically finding and dynamically maintaining optimum data service capabilities (DSCs) to data service level objective groups (DSLOGs) matches. Benefits of automatically finding and dynamically maintaining optimum DSLOG-DSC matches include: sparing users the tedious task of trying to match DSCs to DSLOGs, eliminating the chance for human error in assigning matches, improving the accuracy of maintaining accurate matches since users may neglect to verify and/or update DSLOG to DSC matches as conditions change, and identifying potential problem areas in the matches, such as when a DSLOG cannot be matched or when a particular DSC is over-relied upon. Additionally, the illustrative embodiments provide for automatically generating warnings if an adequate DSC match for a DSLOG is not found or if there is an over-dependence on any one DSC.

Figure 3:
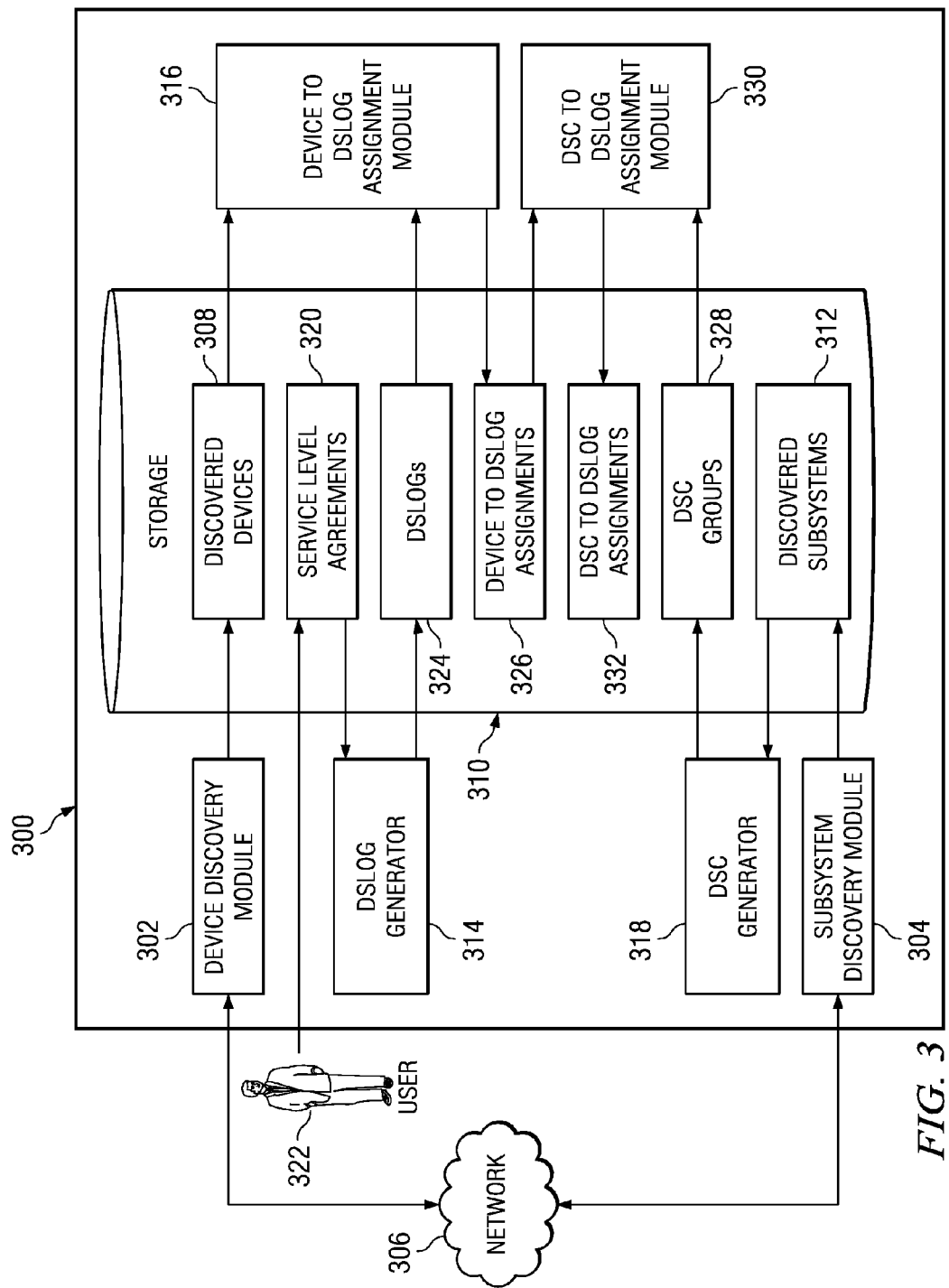
FIG. 3 depicts an exemplary dynamic matching system for matching DSCs with DSLOGs in accordance with an illustrative embodiment.

FIG. 3 depicts an exemplary dynamic matching system for matching DSCs with DSLOGs in accordance with an illustrative embodiment. Dynamic matching system 300 may include device discovery module 302 and subsystem discovery module 304. Device discovery module 302 discovers storage dependent devices that use a storage subsystem and are connected to network 306, such as network 102 of FIG. 1. Device discovery module 302 automatically scans network 306 for all devices that are set to use a storage subsystem and attributes associated with such devices. Device discovery module 302 then updates discovered devices 308 within storage device 310 with the newly discovered devices based on their storage requirements. Initiation of the discovery of devices by device discovery module 302 may be through a signal, such as a predetermined time signal, a request signal from an administrator, or the like.

Subsystem discovery module 304 discovers storages devices that are connected to network 306, such as network 102 of FIG. 1. Subsystem discovery module 304 scans network 306 for all storage devices and attributes associated with such storage devices, such as storage subsystems, tape libraries, fibre channel switches, or the like. Subsystem discovery module 304 then updates discovered subsystems 312 within storage 310 with the newly discovered storage devices based on their attributes. Initiation of the discovery of devices by subsystem discovery module 304 may be through a signal, such as a predetermined time signal, a request signal from an administrator, or the like.

Dynamic matching system 300 may also include DSLOG generator 314, device to DSLOG assignment module 316, and DSC generator 318. DSLOG generator 314 uses data service level objectives to assist in aligning the value of data with service level agreements 320 for that data. Service level objectives (SLOs) describe the service level agreement that data has on the supporting data and storage services for a given business use. Service level agreements 320 are typically the result of a classification process that determines what service is needed by the data over its lifecycle. Service level agreements 320 are indicated by measurable objectives for requirements, such as data recovery time, recovery point, maximum budget cost, read-write ratio, average I/O rate, average data throughput performance, other user-defined objectives, or the like. User 322 may assign service requirements as service level agreements 320. DSLOG generator 314 automatically matches the service requirements of service level agreements 320 to various data SLOs in DSLOG generator 314 to created DSLOGs 324. For example, DSLOGs 324 may be labeled with names or types, such as bronze, silver, gold, or the like. Each of DSLOGs 324 is for a level of service that may be provided for data, from a lowest level to a highest level.

Device to DSLOG assignment module 316 automatically assigns each of the devices in discovered devices 308 to one of DSLOGs 324 using user defined requirements, such as level of service, storage subsystem requirements, or the like. Level of service for one of DSLOGs 324 may pertain to an application on the DSLOG and the service level agreement to support the application. Device to DSLOG assignment module 316 stores device to DSLOG assignments 326 in storage 310.

DSC generator 318 uses the characteristics of discovered subsystems 312 to create DSC groups 328. Exemplary characteristics are underlying data management software, storage services, the actual storage itself, other user-defined characteristics, or the like. The service characteristics for each DSC in DSC groups 328 are expressed as attributes in terms that are consistent with data DSLOGs 324. Each of the DSCs in DSC groups 328 reflect the service objectives that may be satisfied by the characteristics of the DSC, such as recovery time, recovery point, cost, average I/O rate, average data throughput, or the like.

DSC to DSLOG assignment module 330 uses device to DSLOG assignments 326 and DSC groups 328 to identify one or more DSCs within DSC groups 328 that meets the service requirements of each of the DSLOGs within device to DSLOG assignments 326. Identification of a DSC for a particular DSLOG may result in a single match for each DSLOG, or may provide a list of satisfactory DSCs to choose from. DSC to DSLOG assignment module 330 may be designed so that all DSC-DSLOG matches are found or DSC to DSLOG assignment module 330 may be tailored so that the best match is found for a specified DSC or DSLOG. DSC to DSLOG assignment module 330 may be configured with several search criteria, such as:

1. Satisfy identification based on finding a DSC where all DSLOG objectives have an exact matching capability.
2. Satisfy identification based on finding a DSC where all DSLOG objectives have a capability that matches (or exceeds) the DSLOG requirements. Then identify the DSC with the lowest cost.
3. Satisfy search based on the most matching objectives/capabilities, for example, allow weighting factors to be assigned to various objectives, where the weighting factors are the objectives that are considered more important.
4. Satisfy search based on closest matching criteria. This includes choosing which DSLOG objectives must be satisfied by a DSC or which DSLOG objectives may be satisfied by finding the closest match, for example, objective is a maximum budget cost of $500, but closest DSC is above that at $550.
5. Match on DSLOG & DSC type, for example, gold, silver, bronze, or the like.
6. Match based on comparing scope, for example, DSC must be for a particular type of subsystem to match a computer DSLOG, such as a tape library, fibre channel switches, or the like.
7. Match based on physical connectivity considerations. DSC must be associated with a storage subsystem that can have storage assigned (has connectivity) to a computer associated with DSLOG.

DSC to DSLOG assignment module 330 may also be configured to run for DSLOGs meeting a specified criteria, such as all DSLOGs, DSLOGs with a specific type, such as gold, DSLOGs with a recovery time objective less than a specified time, a combination of objectives, such as DSLOGs with recovery time objective less than a specified time and a maximum budget cost between $400-$500, or the like. Once DSC to DSLOG assignment module 330 identifies a DSC that meets the requirements of the DSLOG, DSC to DSLOG assignment module 330 assigns the identified DSC to the DSLOG thereby coupling the DSC to the DSLOG. DSC to DSLOG assignment module 330 stores these assignments as DSC to DSLOG assignments 332.

DSC to DSLOG assignment module 330 may also be set up to include warning limits for issues, such as when a DSLOG to DSC assignment ratio is greater than a specified number, when a maximum number of DSLOGs are assigned to any DSC exceeds a specified number, or the like. When such limits are met, DSC to DSLOG assignment module 330 may issue warnings using various techniques, such as simple network management protocol (SNMP) traps, email, Tivoli Enterprise Console® (TEC) events, Windows® event, graphical user interface (GUI) message box, or the like.

Each of the operations performed in dynamic matching system 300 may be automatic and dynamic when initiated. Dynamic matching system 300 may be initiated based on events, for example, when a DSLOG is modified, when a DSC is modified, when a storage device's status changes, at a periodic time interval, at a scheduled time, when manually initiated, or the like. However, any of the discovering, generating, and assigning operations may be performed manually using an input device and a graphical user interface to the software of dynamic matching system 300.

Figure 4:
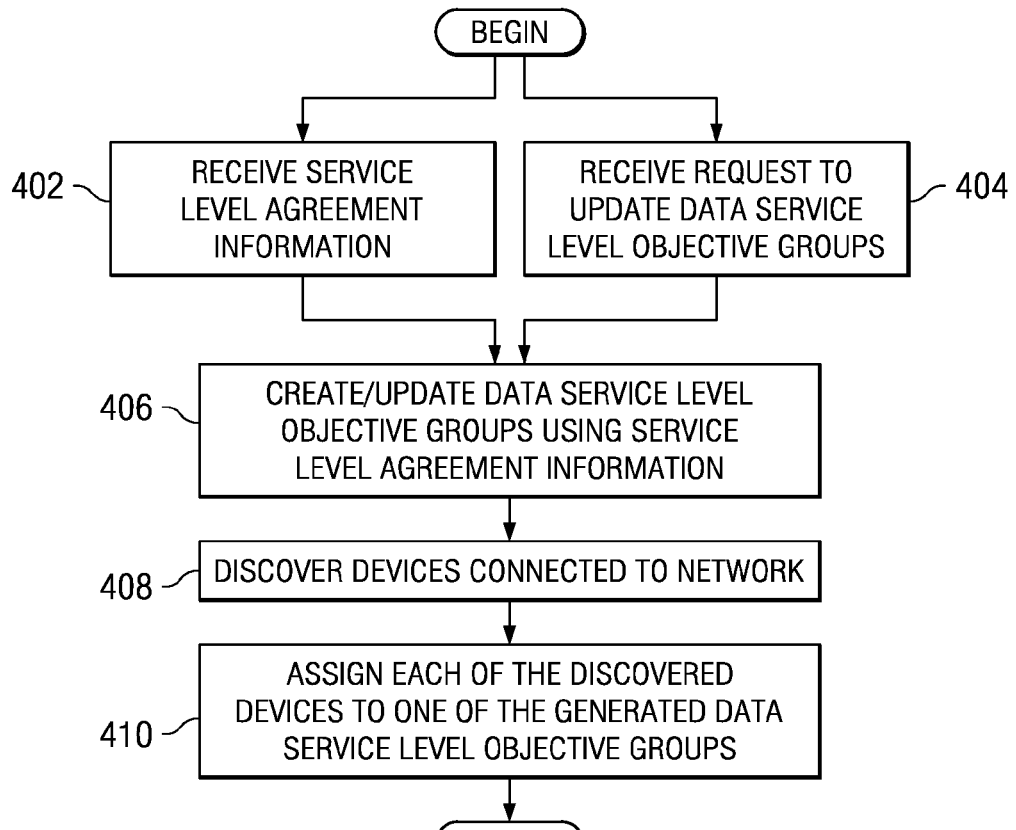
FIG. 4 depicts a flowchart outlining an exemplary operation for discovering network devices and assigning the devices to data service level objective groups in accordance with an illustrative embodiment.

FIG. 4 depicts a flowchart outlining an exemplary operation for discovering network devices and assigning the devices to data service level objective groups in accordance with an illustrative embodiment. As the operation begins, a dynamic matching system, such as dynamic matching system 300 of FIG. 3, receives new service level agreements (step 402) or receives a request to update the data service level objective groups (DSLOGs) (step 404). A request to update the DSLOGs may be through an event, such as when a DSLOG is modified, at a periodic time interval, at a scheduled time, when manually initiated, or the like. Responsive to either of these events, a DSLOG generator, such as DSLOG generator 314 of FIG. 3, uses predefined data service level objectives to create or update DSLOG values that are in alignment with the new and/or existing service level agreement information (step 406). A device discovery module, such as device discovery module 302 of FIG. 3, automatically scans the storage subsystem network for all storage dependent devices that are set to use the storage subsystem and attributes associated with the devices (step 408). After all of the DSLOGs have been defined and all of the devices that are connected to the storage subsystem are discovered, a device to DSLOG assignment module, such as device to DSLOG assignment module 316 of FIG. 3, automatically assigns each of the discovered devices to one of the DSLOGs based on the user defined requirements (step 410), with the operation ending thereafter.

Figure 5:
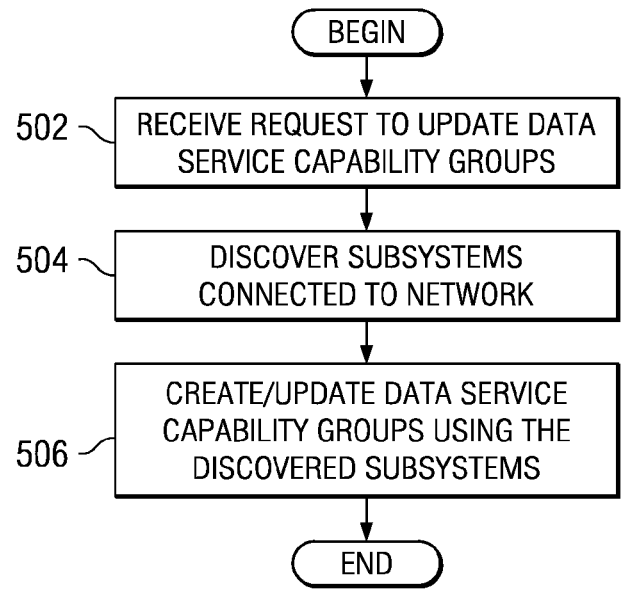
FIG. 5 depicts a flowchart outlining an exemplary operation of discovering data service capabilities in accordance with an illustrative embodiment.

FIG. 5 depicts a flowchart outlining an exemplary operation of discovering data service capabilities in accordance with an illustrative embodiment. As the operation begins, a dynamic matching system, such as dynamic matching system 300 of FIG. 3, receives a request to update the data service capability (DSC) groups (step 502). Initiation of the request to update the DSC groups may be through a signal, such as a predetermined time signal, a request signal from an administrator, or the like. A subsystem discovery module, such as subsystem discovery module 304 of FIG. 3, scans the subsystem storage network for all storage devices and attributes associated with such storage devices, such as storage subsystems, tape libraries, Fibre Channel switches, or the like (step 504). Then a DSC generator, such as DSC generator 318 of FIG. 3, uses the characteristics of the discovered subsystems to create or update DSC groups (step 506), with the operation ending thereafter. Each of the created or updated DSCs reflect the service objectives that may be satisfied by the characteristics of the DSC, such as recovery time, recovery point, cost, average I/O rate, average data throughput, or the like.

Figure 6:
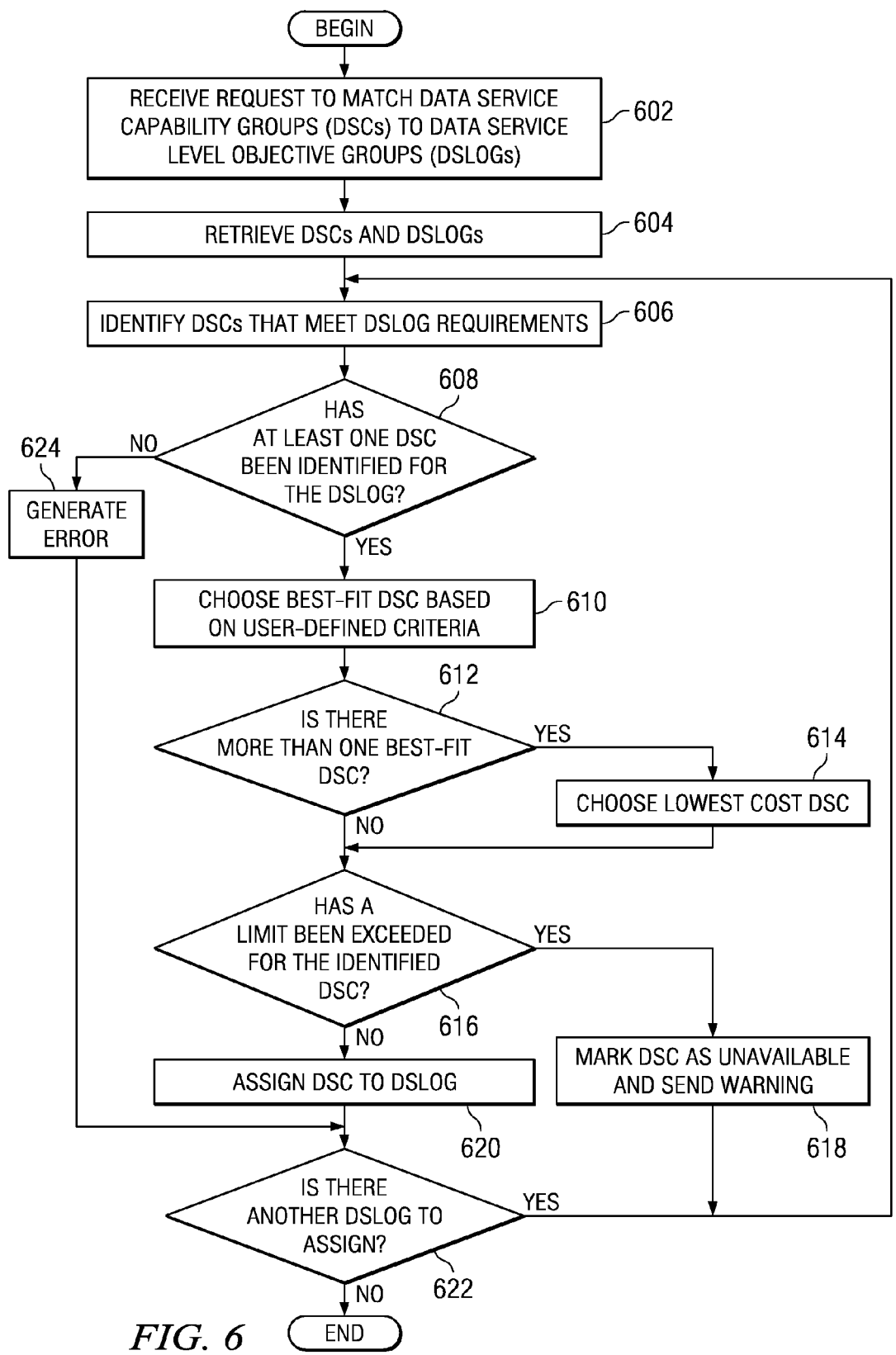
FIG. 6 depicts a flowchart outlining an exemplary operation for dynamically matching DSCs with DSLOGs in accordance with an illustrative embodiment.

FIG. 6 depicts a flowchart outlining an exemplary operation for dynamically matching DSCs with DSLOGs in accordance with an illustrative embodiment. As the operation begins, a dynamic matching system, such as dynamic matching system 300 of FIG. 3, receives a request to match DSCs to DSLOGs (step 602). The request may be through an event, such as when a DSLOG is modified, when a DSC is modified, when a storage device's status changes, at a periodic time interval, at a scheduled time, when manually initiated, or the like. A DSC to DSLOG assignment module, such as DSC to DSLOG assignment module 330 of FIG. 3, retrieves the DSC sets identified by FIG. 5 and the assigned DSLOG sets from FIG. 4 (step 604). Then the DSC to DSLOG assignment module attempts to identify one or more DSCs within the DSC groups that meet the service requirements of each of the DSLOGs (step 606). As discussed above, identification of a DSC for a particular DSLOG may result in a single match for each DSLOG or may provide a list of satisfactory DSCs to choose from. The DSC to DSLOG assignment module may identify all DSC-DSLOG matches that are found or a best match.

Then the DSC to DSLOG assignment module determines if at least one DSC has been identified (step 608). If at step 608 at least one DSC is identified, then the DSC to DSLOG assignment module uses user defined criteria to identify the best-fit DSC (step 610). Exemplary criteria for establishing a best-fit DSC may be:
1. A DSC where all DSLOG objectives have an exact matching capability.
2. A DSC where all DSLOG objectives have a capability that matches (or exceeds) the DSLOG requirements.
3. A DSC that has the most matching DSLOG objectives, the most matching may be identified through the use of user defined requirements.
4. A DSC that has the closest matching criteria.
5. A DSC that has the same type as the DSLOG type, for example, gold, silver, bronze, or the like.
6. A DSC that has the same scope as the DSLOG scope.
7. A DSC that is physically coupled to the DSLOG.

If after analyzing all of the identified DSCs, the DSC to DSLOG assignment module determines if there is more than one best-fit DSC (step 612). If at step 612 there is more than one best-fit DSC, the DSC to DSLOG assignment module may choose the lowest-cost DSC (step 614). If at step 614 a condition is present where two or more lowest cost DSCs are present, then DSC to DSLOG assignment module may automatically arbitrarily select one of the DSCs, present a list of viable candidates for a user to manually choose from, employ user defined 'tie-breaker' criteria, or the like, to determine a best-fit DSC. If at step 612 there is not more than one best-fit DSC or at step 614 after the DSC to DSLOG assignment module chooses the lowest-cost best-fit DSC, the DSC to DSLOG assignment module determines if a limit has been exceeded for the identified DSC (step 616). Limits for the DSCs may be for a limit, such as when a DSLOG to DSC assignment ratio is greater than a specified number, when a maximum number of DSLOGs assigned to any DSC exceeds a specified number, or the like.

If at step 616 a limit has been met, then the DSC to DSLOG assignment module blocks the DSC as an unavailable DSC and sends a warning to the administrator (step 618), with the operation returning to step 606. If at step 616 a limit has not been met for the DSC, then the DSC to DSLOG assignment module assigns the DSC to the DSLOG (step 620). The DSC to DSLOG assignments are stored by the DSC to DSLOG assignment module. Then the DSC to DSLOG assignment module determines if there is another DSLOG which needs to be assigned (step 622). If at step 622 there is another DSLOG, the operation returns to step 606. If at step 622 there is not another DSLOG, the operation ends. Returning to step 608, if the DSC to DSLOG assignment module fails to identify one DSC that meets the requirements of the DSLOG, then the DSC to DSLOG assignment module generates an error to the administrator (step 624), with the operation continuing to step 622.

Thus, the illustrative embodiments provide for automatically finding and dynamically maintaining optimum data service capabilities (DSCs) to data service level objective groups (DSLOGs) matches. In the illustrative embodiments storage requirements are identified for the storage dependent device that is coupled to a network. A set of storage subsystems that are coupled to the network are also identified. A determination is made as to whether at least one storage subsystem in the set of storage subsystems meets the storage requirements of the storage dependent device. Responsive to identifying the at least one storage subsystem that meets the storage requirements of the storage dependent device, thereby forming an identified storage subsystem, at least one storage subsystem is coupled to the storage dependent device. The storage dependent device utilizes storage capabilities of the identified storage subsystem.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for matching a storage dependent device to a storage subsystem, the method comprising:
    identifying storage requirements for the storage dependent device, wherein the storage dependent device is coupled to a network;
    identifying a set of storage subsystems that are coupled to the network;
    determining if at least one storage subsystem in the set of storage subsystems meets the storage requirements of the storage dependent device;
    responsive to identifying the at least one storage subsystem that meets the storage requirements of the storage dependent device, thereby forming an identified storage subsystem,
    determining if a use of the identified storage subsystem exceeds an assignment limit;
    responsive to use of the identified storage subsystem exceeding the assignment limit, removing the identified storage subsystem from the set of storage subsystems that meet the storage requirements of the storage dependent device;
    determining if another storage subsystem in the set of storage subsystems meets the storage requirements of the storage dependent device;
    responsive to identifying more than one storage subsystem that meets the storage requirements of the storage dependent device, determining at least one lowest cost storage subsystem, wherein the at least one lowest cost storage subsystem is determined based on user submitted criteria that specifies a maximum budget cost for a use of the storage dependent device and wherein a use of the lowest cost storage system either meets or comes closest to the maximum budget cost; and
    responsive to identifying the at least one lowest cost storage subsystem, coupling the at least one lowest cost storage subsystem to the storage dependent device.

2. The method of claim 1, wherein removing the identified storage subsystem from the set of storage subsystems that meet the storage requirements of the storage dependent device comprises:
    marking the identified storage subsystem as unavailable in a data structure; and
    sending a notification to a user that the identified storage subsystem is unavailable.

3. The method of claim 1, wherein the storage requirements include at least one of a data recovery time, a recovery point, a maximum budget cost, a read-write ratio, an average I/O rate, or an average data throughput performance.

4. The method of claim 1, wherein the set of storage subsystems are grouped into at least one of a set of data service capability groups based on attributes of the set of storage, subsystems and wherein the attributes are at least one of a data recovery time, a recovery point, the maximum budget cost, a read-write ratio, an average I/O rate, or an average data throughput performance.

5. The method of claim 1, wherein the storage dependent device is one of a set of storage dependent devices and wherein the set of storage dependent devices are grouped into at least one of a set of data service level objective groups based on the storage requirements.

6. A computer program product comprising a non-transitory computer useable storage medium having a computer readable program stored thereon, wherein the computer readable program, when executed in a data processing system, causes the data processing system to:
    identify storage requirements for the storage dependent device; wherein the storage dependent device is coupled to a network;
    identify a set of storage subsystems that are coupled to the network;
    determine if at least one storage subsystem in the set of storage subsystems meets the storage requirements of the storage dependent device;
    responsive to identifying the at least one storage subsystem that meets the storage requirements of the storage dependent device, thereby forming an identified storage subsystem;
    determine if a use of the identified storage subsystem exceeds an assignment limit;
    responsive to use of the identified storage subsystem exceeding the assignment limit, remove the identified storage subsystem from the set of storage subsystems that meet the storage requirements of the storage dependent device;
    determine if another storage subsystem in the set of storage subsystems meets the storage requirements of the storage dependent device;
    responsive to identifying more than one storage subsystem that meets the storage requirements of the storage dependent device, determine at least one lowest cost storage subsystem, wherein the at least one lowest cost storage subsystem is determined based on user submitted criteria that specifies a maximum budget cost for a use of the storage dependent device and wherein a use of the lowest cost storage system either meets or comes closest to the maximum budget cost; and responsive to identifying the at least one lowest cost storage subsystem, couple the at least one lowest cost storage subsystem to the storage dependent device.

7. The computer program product of claim 6, wherein the computer readable program to remove the identified storage subsystem from the set of storage subsystems that meet the storage requirements of the storage dependent device further causes the data processing system to:

mark the identified storage subsystem as unavailable in a data structure; and send a notification to a user that the identified storage subsystem is unavailable.

8. The computer program product of claim 6, wherein the storage requirements include at least one of a data recovery time, a recovery point, a maximum budget cost, a read-write ratio, an average I/O rate, or an average data throughput performance.

9. A system, comprising:

a processor; and a memory coupled to the processor, wherein the memory comprises instructions which, when executed by the processor, cause the processor to:

identify storage requirements for the storage dependent device, wherein the storage dependent device is coupled to a network;

identify a set of storage subsystems that are coupled to the network;

determine if at least one storage subsystem in the set of storage subsystems meets the storage requirements of the storage dependent device;

responsive to identifying the at least one storage subsystem that meets the storage requirements of the storage dependent device, thereby forming an identified storage subsystem, determine if a use of the identified storage subsystem exceeds an assignment limit;

responsive to use of the identified storage subsystem exceeding the assignment limit, remove the identified storage subsystem from the set of storage subsystems that meet the storage requirements of the storage dependent device;

determine if another storage subsystem in the set of storage subsystems meets the storage requirements of the storage dependent device;

responsive to identifying more than one storage subsystem that meets the storage requirements of the storage dependent device, determine at least one lowest cost storage subsystem, wherein the at least one lowest cost storage subsystem is determined based on user submitted criteria that specifies a maximum budget cost for a use of the storage dependent device and wherein a use of the lowest cost storage system either meets or comes closest to the maximum budget cost; and responsive to identifying the at least one lowest cost storage subsystem, couple the at least one lowest cost storage subsystem to the storage dependent device.

10. The system of claim 9, wherein the instructions to remove the identified storage subsystem from the set of storage subsystems that meet the storage requirements of the storage dependent device further cause the processor to:

mark the identified storage subsystem as unavailable in a data structure; and send a notification to a user that the identified storage subsystem is unavailable.

11. The system of claim 9, wherein the storage requirements include at least one of a data recovery time, a recovery point, a maximum budget cost, a read-write ratio, an average I/O rate, or an average data throughput performance.

12. The method of claim 1, further comprising:

responsive to a failure to identify the at least one storage system that meets the storage requirements of the storage dependent device, identifying the at least one storage subsystem that exceeds the storage requirements; and responsive to identifying the at least one storage subsystem that exceeds the storage requirements, coupling the at least one storage subsystem to the storage dependent device.

13. The computer program product of claim 6, wherein the computer readable program further causes the data processing system to:

responsive to a failure to identify the at least one storage system that meets the storage requirements of the storage dependent device, identify the at least one storage subsystem that exceeds the storage requirements; and responsive to identifying the at least one storage subsystem, couple the at least one storage subsystem to the storage dependent device.

14. The system of claim 9, wherein the instructions further cause the processor to:

responsive to a failure to identify the at least one storage system that meets the storage requirements of the storage dependent device, identify the at least one storage subsystem that exceeds the storage requirements; and responsive to identifying the at least one storage subsystem, couple the at least one storage subsystem to the storage dependent device.

\* \* \* \* \*